US011372526B2

(12) United States Patent
Mashayekhi et al.

(10) Patent No.: US 11,372,526 B2
(45) Date of Patent: *Jun. 28, 2022

(54) METHOD FOR ANOMALY DETECTION IN CLUSTERED DATA STRUCTURES

(71) Applicant: ROYAL BANK OF CANADA, Toronto (CA)

(72) Inventors: Morteza Mashayekhi, Toronto (CA); Iman Rezaeian, Toronto (CA); Jonathan Albert North Anders, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/215,992

(22) Filed: Mar. 29, 2021

(65) Prior Publication Data

US 2021/0216179 A1  Jul. 15, 2021

Related U.S. Application Data

(63) Continuation of application No. 16/351,259, filed on Mar. 12, 2019, now Pat. No. 10,990,249.

(60) Provisional application No. 62/641,530, filed on Mar. 12, 2018.

(51) Int. Cl.
*G06F 7/00* (2006.01)
*G06F 16/00* (2019.01)
*G06F 3/0484* (2022.01)

(52) U.S. Cl.
CPC .................. *G06F 3/0484* (2013.01)

(58) Field of Classification Search
None
See application file for complete search history.

(56) References Cited

U.S. PATENT DOCUMENTS

| 6,253,364 | B1 | 6/2001 | Tanaka |
| 2003/0212692 | A1 | 11/2003 | Campos |
| 2007/0053564 | A1 | 3/2007 | Matsumoto |
| 2010/0082623 | A1 | 4/2010 | Arora |
| 2013/0138503 | A1 | 5/2013 | Brown |
| 2014/0012901 | A1 | 3/2014 | Ruhl |

(Continued)

*Primary Examiner* — Tuan A Pham
(74) *Attorney, Agent, or Firm* — Norton Rose Fulbright Canada LLP

(57) ABSTRACT

A method for generating visual representations of financial interests includes: receiving an input data set including one or more data structures storing data fields and data values representative of financial interests; extracting, from the input data, one or more extracted features from the funds, the extracted features collectively indicative of a distance between different funds; generating one or more clusters of funds, based on the extracted features of the funds; determining, based on identified differences between one or more funds relative to at least one other fund in a corresponding cluster of funds, one or more fund anomalies based on the one or more extracted features; generating one or more adjustment recommendations based on the one or more fund anomalies, the one or more adjustment recommendations representing control instruction sets for automatically modifying characteristics of the corresponding fund.

19 Claims, 9 Drawing Sheets

(56) References Cited

U.S. PATENT DOCUMENTS

2014/0372482 A1\* 12/2014 Martin ................ G06F 16/2465
707/776
2015/0033084 A1 1/2015 Sasturkar
2016/0063097 A1 3/2016 Brown
2017/0364851 A1\* 12/2017 Maheshwari .... G06Q 10/06314

\* cited by examiner

METHOD FOR ANOMALY DETECTION IN CLUSTERED DATA STRUCTURES

CROSS-REFERENCE TO RELATED APPLICATIONS

This application is a continuation of U.S. patent application Ser. No. 16/351,259, filed on Mar. 12, 2019, which claims all benefit including priority, of U.S. Provisional Patent Application 62/641,530, filed Mar. 12, 2018, and entitled "METHOD FOR ANOMALY DETECTION IN CLUSTERED DATA STRUCTURES"; the entireties of both of which are hereby incorporated by reference.

FIELD

Embodiments of the present disclosure generally relate to the field of data anomaly detection, and more specifically, embodiments relate to systems and methods of generating one or more user interfaces adapted for providing a custody transactions intelligence system by detecting anomalies in clustered data structures.

BACKGROUND

Complex data sets often contain classes or groupings which may include elements each with their own data values and parameters. In some instances, classes may be purported to have similar characteristics; however, due to data complexities and potential interrelationships or divergences between individual elements within those classes comparing these complex data sets may be a challenge. For example, financial assets, such as those stored in funds or baskets, may be difficult to analyze, given the inherent complexities in the data associated with the underlying assets and strategies.

SUMMARY

Generating user interfaces and conducting clustering data transformation is a technically challenging endeavor. Fund clustering, once identified, can be represented in a data structure and processed to automatically identify anomalous characteristics of one or more funds. The anomalies can be adjusted for to modify characteristics of the one or more funds, for example, to adjust them to be similar to well-performing funds, or to enforce rules around diversification, downside risk, among others.

Specially configured user interfaces are provided by the system, rendering visualizations based on the clustering that aid in visual analysis of the one or more funds, and their characteristics. Different visualizations are possible as different characteristics and approaches are chosen for clustering.

In accordance with an aspect, there is provided a computer implemented method for generating visual representations of financial interests, the method comprising: receiving an input data set including one or more data structures storing data fields and data values representative of financial interests; extracting, from the input data, one or more extracted features from the funds, the extracted features collectively indicative of a distance between different funds; generating one or more clusters of funds, based on the extracted features of the funds; determining, based on identified differences between one or more funds relative to at least one other fund in a corresponding cluster of funds, one or more fund anomalies based on the one or more extracted features; generating one or more adjustment recommendations based on the one or more fund anomalies, the one or more adjustment recommendations representing control instruction sets for automatically modifying characteristics of the corresponding fund.

In another aspect, characteristics of the financial interests include at least one of asset types, asset quantities, asset values, market values, book values, dividend yield, bond coupons, ticker symbols, option identifiers, country, credit rating, maturity date, and risk ratings, the characteristics representing the extracted features of the funds.

In another aspect, the generating of the one or more clusters of funds includes a multi-layered clustering approach wherein a first rough clustering approach is combined with a second fine clustering approach.

In another aspect, the generating of the one or more clusters of funds includes K-Medoids clustering.

In another aspect, the extracted features include at least one of credit rating, face value, annual dividend forecast, a number of fi securities, a number of eq securities, a default probability coupon rate, a market value.

In another aspect, there is provided a computer implemented system, including one or more computer processors coupled to computer memory, the one or more computer processors configured for performing steps of a method described above.

In another aspect, there is provided a non-transitory computer readable medium, storing machine interpretable instructions, which when executed, cause one or more processors to perform steps of a method according to a method described above.

In another aspect, there is provided a computer-implemented method for dynamically presenting graphical user interface elements in a graphical user interface for a plurality of multi-dimensional data sets. The method includes: receiving one or more input data sets representing data associated with a basket identifier, the basket identifier for identifying a plurality of asset data sets as a basket; generating, from the one or more input data sets, a plurality of data values for populating the plurality of asset data sets; performing a first clustering to generate a first cluster data set for associating each of a plurality of baskets with one of a plurality of first clusters, the first clustering based on at least one parameter associated with the basket identifier; performing a second clustering to generate a second cluster data set for associating each of a plurality of baskets in a particular first cluster of the plurality of first clusters with one of a plurality of second clusters, the second clustering based on at least one parameter associated with the particular first cluster; orthogonally transforming data associated with basket identifiers, the basket identifiers associated with a particular second clusters to generate a set of principal component values; and generating signals for displaying a plurality of graphical user interface elements on a two or three dimensional plot corresponding to the set of principal component values, each graphical user interface element having a visual feature associated with a first cluster or a second cluster.

In another aspect, there is provided a computer implemented system, including one or more computer processors coupled to computer memory, the one or more computer processors configured for: receiving one or more input data sets representing data associated with a basket identifier, the basket identifier for identifying a plurality of asset data sets as a basket; generating, from the one or more input data sets, a plurality of data values for populating the plurality of asset data sets; performing a first clustering to generate a first cluster data set for associating each of a plurality of baskets with one of a plurality of first clusters, the first clustering based on at least one parameter associated with the basket identifier; performing a second clustering to generate a second cluster data set for associating each of a plurality of baskets in a particular first cluster of the plurality of first clusters with one of a plurality of second clusters, the second clustering based on at least one parameter associated with the particular first cluster; orthogonally transforming data associated with basket identifiers, the basket identifiers associated with a particular second clusters to generate a set of principal component values; and generating signals for displaying a plurality of graphical user interface elements on a two or three dimensional plot corresponding to the set of principal component values, each graphical user interface element having a visual feature associated with a first cluster or a second cluster.

In another aspect, there is provided a non-transitory computer readable medium, storing machine interpretable instructions. When executed, the instructions configure one or more processors for receiving one or more input data sets representing data associated with a basket identifier, the basket identifier for identifying a plurality of asset data sets as a basket; generating, from the one or more input data sets, a plurality of data values for populating the plurality of asset data sets; performing a first clustering to generate a first cluster data set for associating each of a plurality of baskets with one of a plurality of first clusters, the first clustering based on at least one parameter associated with the basket identifier; performing a second clustering to generate a second cluster data set for associating each of a plurality of baskets in a particular first cluster of the plurality of first clusters with one of a plurality of second clusters, the second clustering based on at least one parameter associated with the particular first cluster; orthogonally transforming data associated with basket identifiers, the basket identifiers associated with a particular second clusters to generate a set of principal component values; and generating signals for displaying a plurality of graphical user interface elements on a two or three dimensional plot corresponding to the set of principal component values, each graphical user interface element having a visual feature associated with a first cluster or a second cluster.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
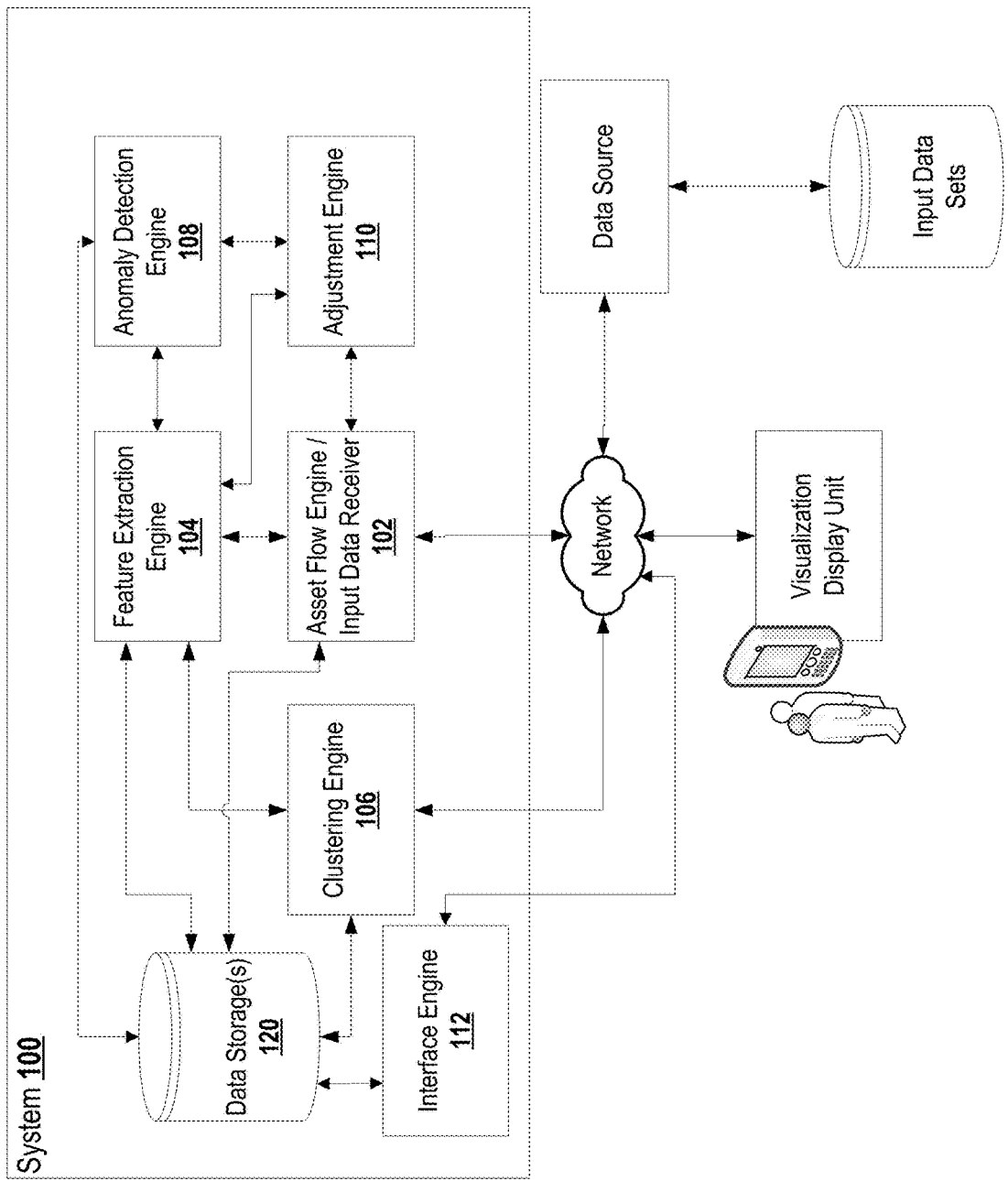
FIG. 1 is a block schematic diagram of an example computer system for facilitating custody transactions intelligence, according to some embodiments.

A technical approach to providing useful interfaces for supporting detailed views of asset movements, exposures, and trends is described. The interfaces are rendered on one or more display devices, and the rendering is controlled by one or more display controllers. A computing device, for example, a computer server, executes machine readable instructions through one or more hardware computer processors operating in conjunction with computer memory.

The detailed views of asset movements, exposures, and trends are generated based at least on a backend clustering approach that is adapted, in some embodiments, to employ multi-level clustering, anomaly detection, and automated adjustments thereof. This mechanism is particularly useful in the context of custodian financial institutions, wherein the user interface is rendered to aid fund managers responsible for safeguarding a firm's or an individual's assets. Custodians often hold, in safekeeping on behalf of clients, various types of financial assets, such as bonds, notes, equities, etc.

The detailed views are adapted to apply fund clustering to two or more funds to provide insights about the funds, for example, allowing for convenient evaluation of fund performance against competitors. An anomaly detection mechanism is included that facilitates comparison of fund features across peers to identify deviations (positive or negative). The detailed views are utilized to mechanically determine how fund managers act on a daily basis, and to determine what equities/assets being bought/sold.

The system tracks and monitors asset flows to show asset movements, and clusters funds such that improved and tools are made available to fund managers. Funds are clustered based on analyzed strategies, and for example, in some embodiments, there are 3 main security types and 4 different geographic regions that arrive at 12 fund clusters. Features are extracted based on type of fund, and can be utilized as a verification of fund strategy. Different fund types should have different restrictions, and clustering can be utilized to compare fund to the performance of peers. For example, the system may identify allocations indicating how peers' funds are holding assets and whether performance out of range of peers. Accordingly, recommendation based on peer performance may be generated, for example, by looking at the range of features and recommending missing features from existing funds.

In some embodiments, the system provides one or more dynamic user interfaces for visualizing asset movements, exposures, and trends for fund, fund manager, client level and also various client types. In some situations, asset flows gauge investor sentiment within specific asset classes, sectors, or geographical locations. For instance, if net asset flows for bond funds during a given month are negative by a large amount, this signals broad-based pessimism over the fixed-income markets. In some embodiments, custody transactions and holdings and also client master system data is used to measure inflow and outflow of various types of assets during a defined period such as on a monthly basis.

In some embodiments, the system is adapted to also track changes over time—can give trends, and clustering is automated. Clustering is conducted through multiple levels of complexity, for example, including first level clustering that is purely objective, and a more directed second level clustering. In some embodiments, the data structures representing funds are processed to generated "distances" between clustered funds and/or their features, and accordingly, a fund can be grouped by minimum distance to other clustered funds. Hard clustering approaches may be utilized to look at all features of the data.

The adjustment mechanism is a decision support interface that provides adjustment recommendations, in some embodiments, for presentation to a fund manager, and in other embodiments, for automatic or semi-automatic execution responsive to the detection of an anomaly in a fund. An adjustment recommendation, in some embodiments, is a set of control instructions or a data structure of workflow steps adapted based on norm values and valid ranges of various features which, when executed, cause the system to adjust a fund to address an anomaly.

FIG. 1 is a block schematic diagram of an example computer system for facilitating custody transactions intelligence, according to some embodiments. Each component is implemented as engines operating through or on one or more computer processors.

The computer system 100 is configured to receive an input data set at an asset flow engine/input data receiver 102, the input data set provided in the form of one or more data structures storing data fields and data values representative of financial interests, grouped in the form of a plurality funds. The financial interest information may include asset types, asset quantities, asset values, market values, book values, dividend yield, bond coupons, ticker symbols, option identifiers, country, credit rating, maturity date, risk ratings, among others.

A feature extraction engine 104 is provided to process the input data to assess the funds to generate one or more extracted features from the funds, the extracted features indicative of a distance between different funds. The distance may be stored as a data value for output to a downstream computing device.

A clustering engine 106 is configured to generate one or more linkages adapted for clustering funds based on their high level strategy and forms clusters of peers with the same strategy. In some embodiments, the clustering engine is configured to perform multiple levels of clustering, for example, a second level clustering can be conducted using more detailed features of the funds.

Fund features for clustering may include, for example: market value, asset type allocation (equity, fixed income, money market, balanced), geographical location exposure (canada, usa, international, global), number of holdings, sector allocation diversity (herfindahl index), capitalization (wa_cap), dividend yield (wa_divyield), price to earning ratio (p/e) (wa_peration), coupon rate (wa_couponrate), time to maturity (wa_ttm), credit rating (wa_creditrating), country (developed, emerging, frontier, and standalone markets), country (focused vs diversified).

Out of these features, asset type allocation and geographical location exposure are used for the high-level clustering and the rest of the features can be used for the second level clustering.

An anomaly detection engine 108 is provided to track one or more deviations from identified norms across peer-grouped funds of a cluster, and a fund strategy adjustment and recommendation engine 110 is provided to generate control signals to modify fund strategy and allocations of a particular fund responsive to the identified one or more deviations from the identified norms.

An interface engine 112 controls the rendering of a user interface in accordance with the clustering of the one or more tracked features, displaying separate funds or assets as separate data points on, for example, a two dimensional plot of funds. A graphical representation may be based on directly determine distances from underlying fund characteristics, or a derived characteristic based on an aggregate of asset characteristics.

Figure 2:
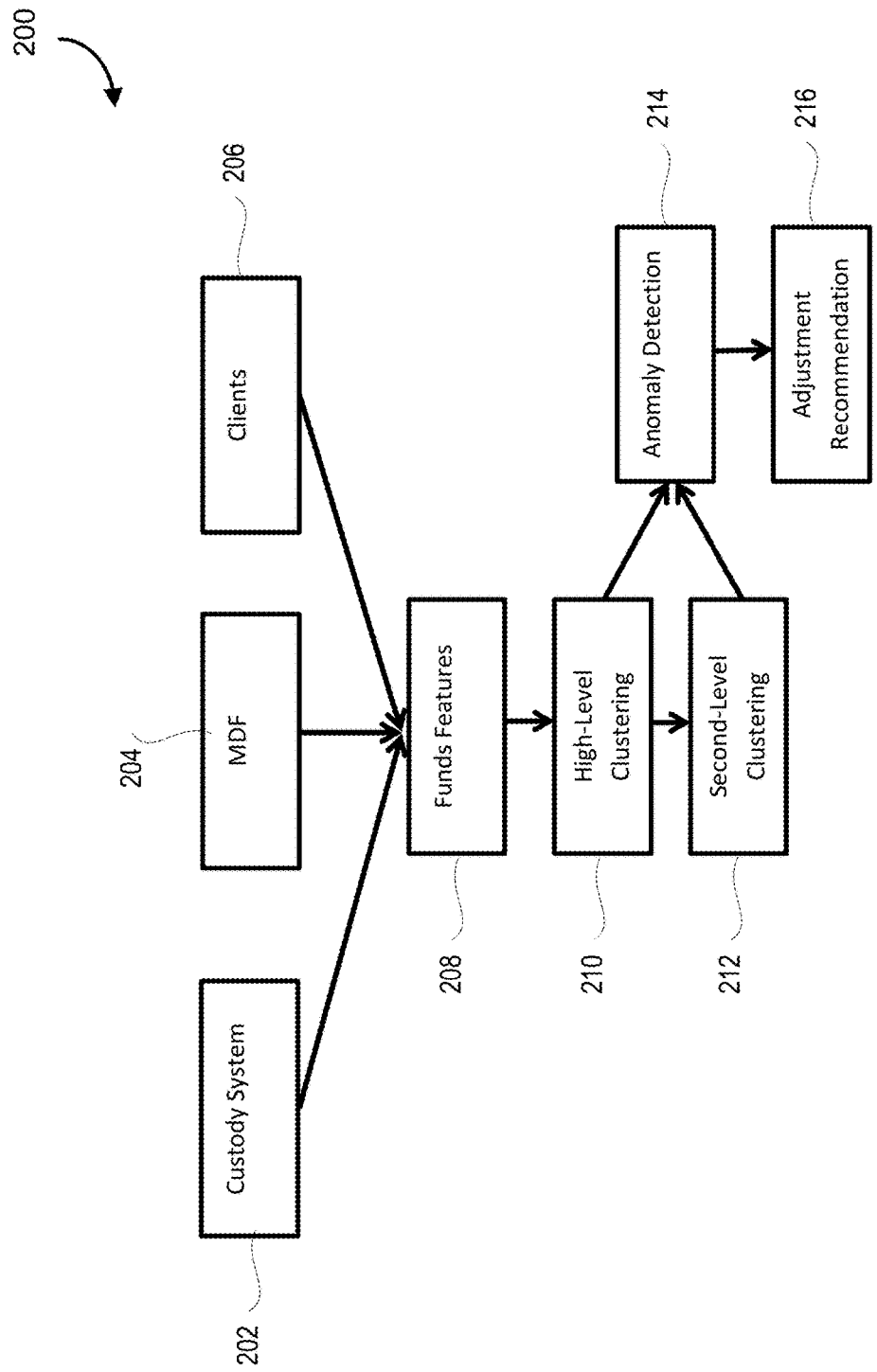
FIG. 2 is a process diagram of a fund custody clustering method, according to some embodiments.

FIG. 2 is a process diagram of a fund custody clustering method, according to some embodiments.

The approach shown in process diagram 200 includes receiving information from a custody system at 202, a market data facility at 204, and one or more computing systems storing client information at 206 in the form of one or more data sets. At 208, fund features are extracted for clustering.

To compute these features, the system utilizes the holding of the funds and also information of underlying security within each fund in accordance with the following relations:

$$\text{Capitalization} = \sum_{1}^{n} \frac{MV_i}{MV}.EQ.Cap_i.Price_i$$

n is number of securities in a fund. MV is fund's market value and $MV_i$, is market value of $i^{th}$ security in the fund. EQ is market value percentage of equity securities in the fund. $Price_i$, and $Cap_i$, are the unit price and capitalization of $i^{th}$ security in the fund.

$$\text{Price to Earning Ratio} = \sum_{1}^{n} \frac{MV_i}{MV}.EQ.\frac{Price_i}{EPS_i}$$

$EPS_i$; is earning per share for $i^{th}$ security. $TTM_i$ is time to maturity for $i^{th}$ security.

$$\text{Time to Maturity} = \sum_{1}^{n} \frac{MV_i}{MV}.FI.TTM_i$$

$$\text{Yield} = \sum_{1}^{k} \frac{MV_i}{MV}.FI.\frac{CR_i.FV_i}{Price_i} + \sum_{1}^{p} \frac{MV_i}{MV}.EQ.\frac{ADF_i}{Price_i}$$

$$\text{Default Probability} = \sum_{1}^{n} \frac{MV_i}{MV}.FI.DP_i$$

$$\text{Coupan Rate} = \sum_{1}^{n} \frac{MV_i}{MV}.FI.CoR_i$$

$$\text{Herfindahl Index} = \sum_{1}^{se} \frac{S_i^2}{MV}$$

$CR_i$ is credit rating, $FV_i$ is Face Value, $ADF_i$ is Annual Dividend Forecast, k number of FI securities, p number of EQ securities. $DP_i$ is default probability and $CoR_i$ is coupon rate for $i^{th}$ security. $S_i$ is the market value of the fund in $i^{th}$ sector.

At 210, the fund features are utilized to conduct clustering, which may include high level clustering, and/or second-level clustering at 212. An example approach to clustering includes the following:

The system can be configured to utilize a K-Medoids approach for doing the clustering. First level of clustering uses high level information of the funds, such as asset type allocation and geographical location exposure to give high level clusters of funds.

Given a particular set of clustering characteristics, the following clusters may result as an example:

| CA-EQ | US-EQ | IN-EQ | GL-EQ |
|-------|-------|-------|-------|
| CA-FI | US-FI | IN-FI | GL-FI |
| CA-MM | US-MM | IN-MM | GL-MM |
| CA-BL | US-BL | IN-BL | GL-BL |

CA: Canada; US: USA; IN: International; GL: Global
EQ: Equity; FI: Fixed Income; MM: Money Market; BL: Balanced A second level of clustering is conducted based on applicable features for each cluster except the MM clusters that were kept only first level of clustering.

| CA-EQ; US-EQ | IN-EQ; GL-EQ | FI-CA; FI-US | FI-IN; FI-GL | BL-CA; BL-US | BL-IN; BL-GL |
|---|---|---|---|---|---|
| Dividend Yield | Country (Focused vs Diversified) | Sector diversity | Country (Focused vs Diversified) | Asset Type Allocation (Eq vs FI) | Asset Type Allocation (Eq vs FI) |
| Price to Earnings Ratio (P/E) | Country (Developed vs Emerging/Frontier Markets) | Time to Maturity | Country (Developed vs Emerging/Frontier Markets) | Dividend Yield | Country (Focused vs Diversified) |
| Capitalization | Dividend Yield | Yield to Maturity | Sector (Corporate, Govt, Provincial, Mortgage) | Capitalization | Country (Developed vs Emerging/Frontier Markets) |
| Sector Allocation | Price to Earnings Ratio (P/E) | Credit Rating | Time to Maturity | Sector Allocation | Sector |
| # of holdings | Capitalization | Coupon Rate | Yield to Maturity | # of holdings | Dividend Yield |
| | Sector Allocation | # of holdings | Default Probability | | Capitalization |
| | # of holdings | | Coupon Rate | | Sector Allocation |
| | | | # of holdings | | # of holdings |

These features help to track funds' strategy during the time in addition to using them for the funds clustering.

Fund clustering was found by Applicants to provide useful high-level insights about the funds. Accordingly, it may be possible to find any fund competitors and how the fund is doing in compare to its competitors, which is one of useful tool to evaluate the fund performance.

In some embodiments, when clustering results are analyzed over time and combined with fund performance information, the system provides clients a view comparing how their funds performed vs. other similar funds over that period. In some embodiments, the system can identify from these results or otherwise insights into which clusters or fund strategies resulted in stronger performance or growth.

Multiple levels of clustering are possible, for example, first, the system is adapted to form 16 high-level clusters using asset type allocation and geographical location exposure, indicative of high level fund strategy. Then for each cluster, a sub-clustering is done using relevant features for each strategy. This more detailed, "finer grain" clustering helps to find competitors more accurately by focusing on more relevant features.

To visualize funds clusters the data points are projected to 3-D space using PCA (Principle Component Analysis). In some embodiments, the first level clustering concentrates on high-level fund strategies features which simply shows the type of a fund (FI, EQ, MM, or BL) and also the region for the underlying securities within a fund i.e. CA, US, IN, or GL. The second level includes finer grain features to compare the funds using more detailed features and is mostly related to funds' performance, and risk and credit rating features of the funds.

The clustering approaches are used to assess one or more features for anomaly detection at 214, whereby the identified one or more anomalies are utilized for generating one or more adjustment recommendations at 216. Anomalies are identified within the funds strategies. Comparing the fund features with the peers' features is a good indicator of health or anomaly of each fund.

In some embodiments, an anomaly is identified when an equity allocation of a fixed-income fund strategy is more than a threshold amount (e.g. 50% this can be an anomaly, because the fund is assumed to hold mostly fixed-income securities rather than equities).

In some embodiments, different methods are used to identify anomalies and deviations. One simple example can be defined based on the average and standard deviation of the fund features. For instance, if one feature is off by two standard deviation, assuming a normal distribution, with 95% probability the value is an anomaly.

If, for example, asset type allocation of a fund in a fixed income fund strategy deviates from the norm of the peers within the same cluster this is a warning signal for the fund manager which can take action accordingly to adjust the fund.

One or more adjustment recommendations can be generated for consumption by a fund manager. When the system discovers an anomaly in a fund, then feature(s) associated with this anomaly are discovered. Based on the norm values and valid range of these features, the system is adapted to generate adjustment recommendations for that fund.

Figure 3:
FIG. 3 is an example interface rendered by the interface engine, according to some embodiments.

FIG. 3 is an example interface rendered by the interface engine, according to some embodiments. In the example 300, The clusters are shown in 3-D space at 302, whereby each fund is provided a position in the 3-D space based on the fund characteristics. In FIG. 3, the clusters are shown based on all of the holdings in the funds. An operator is able to visually inspect the clustering of the funds, and different clusters may be identified (e.g., by way of determined distances), through coloured groupings. Each grouping, representing a cluster, may have associations with the individual data points rendering a particular characteristic to differentiate from other data points. For example, color is shown in FIG. 3, but other mechanisms may be utilized, for example, different shapes, shading, hatch lines, etc. Two example clusters are shown at 304 and 306.

Figure 4:
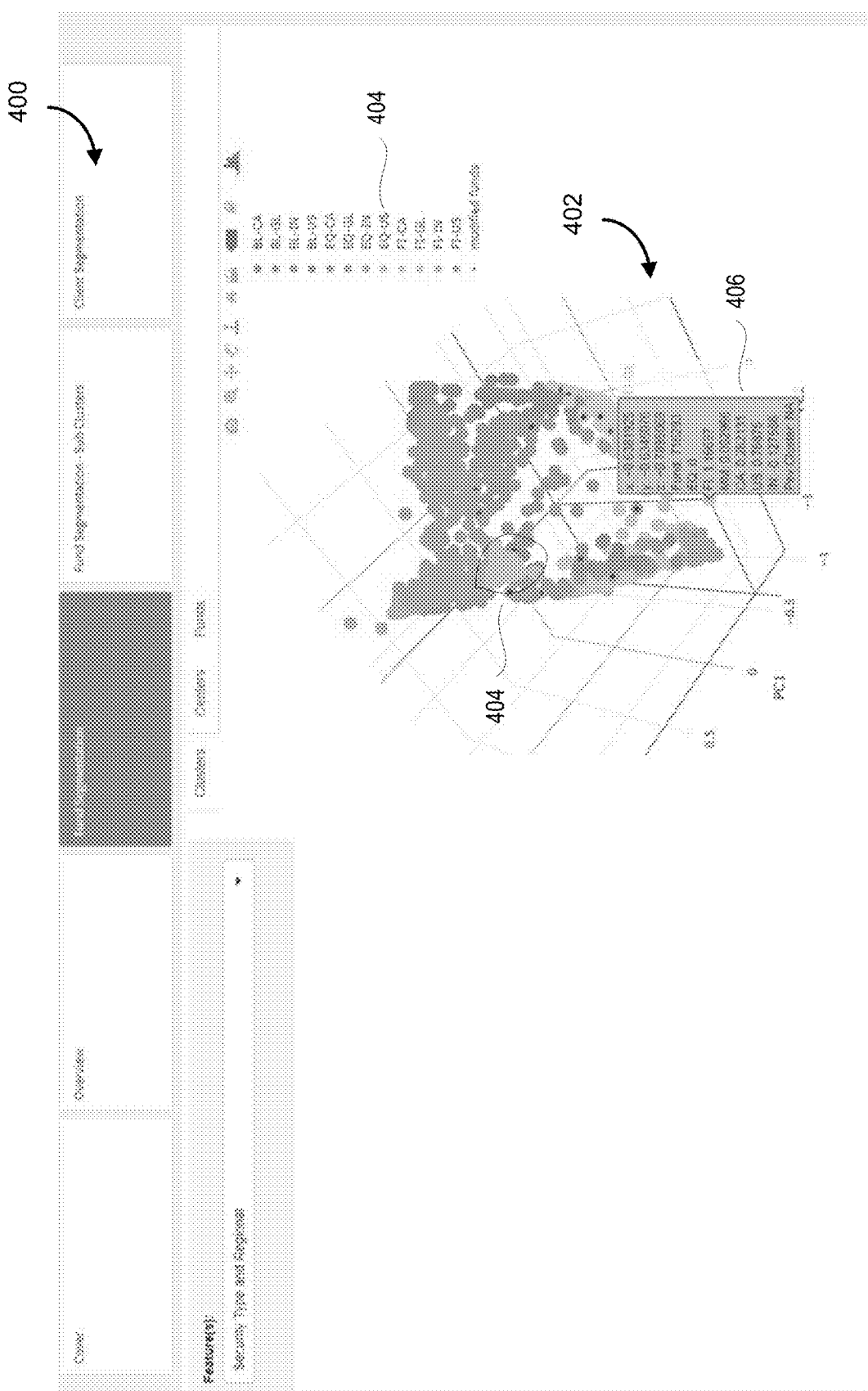
FIG. 4 is an example interface rendered by the interface engine, according to some embodiments.

FIG. 4 is an example interface rendered by the interface engine, according to some embodiments. In the example 400, there is similarly a constellation 402 shown, with characteristics for a particular point and fund shown at 406. An example cluster 404 is encircled for ease of reference. In FIG. 4, the clusters are shown based on a client segmentation.

Figure 5:
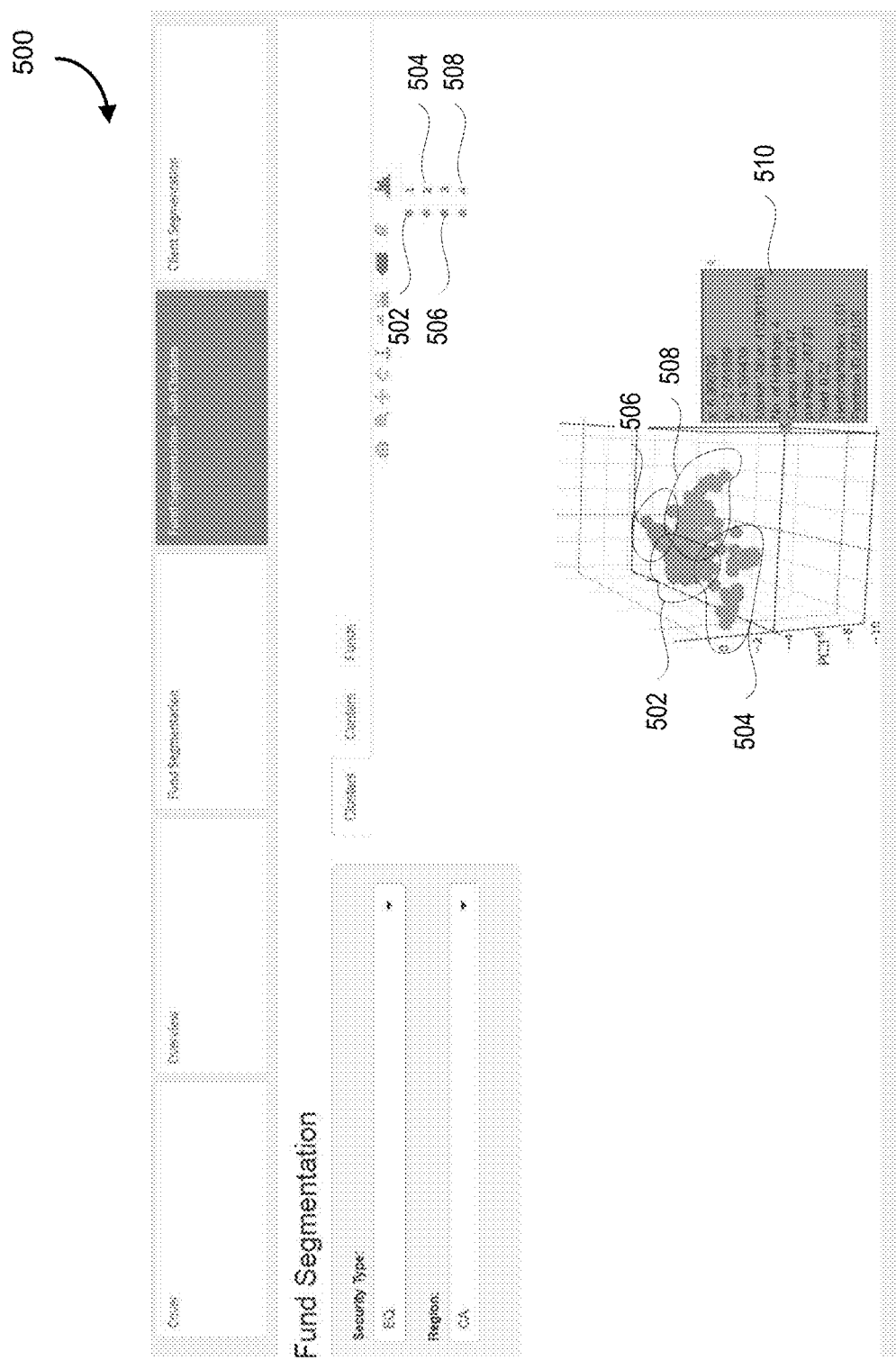
FIGS. 5, 5A and 5B are example interfaces rendered by the interface engine, according to some embodiments.
Figure 5A:
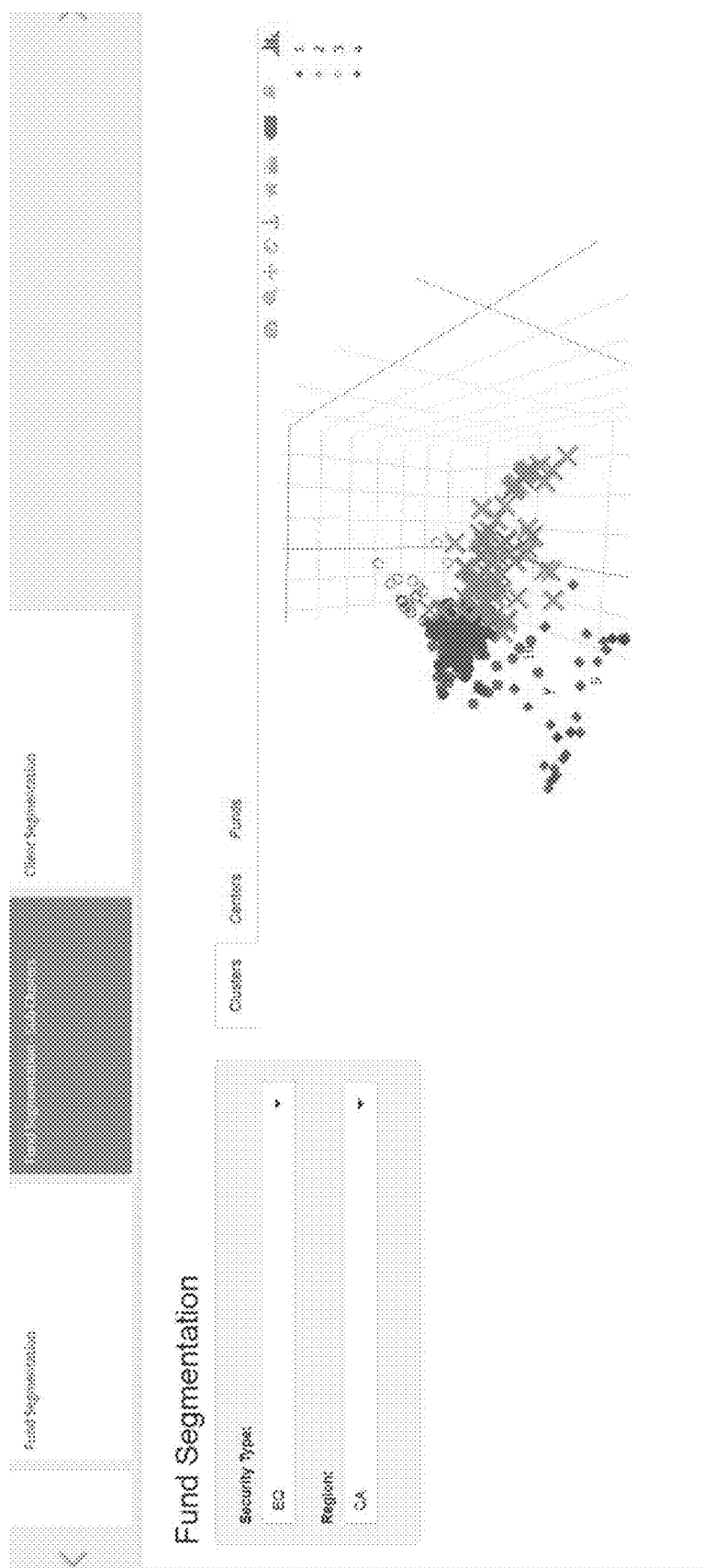

FIGS. 5 and 5A are example interfaces rendered by the interface engine, engine according to some embodiments. In FIG. 5, the clusters are shown based on a second clustering approach that is more fine-tuned based on individual characteristics of funds. Clusters 502, 504, 506, and 508 are shown, and 510 is a widget display that shows characteristics of a particular fund.

Figure 5B:
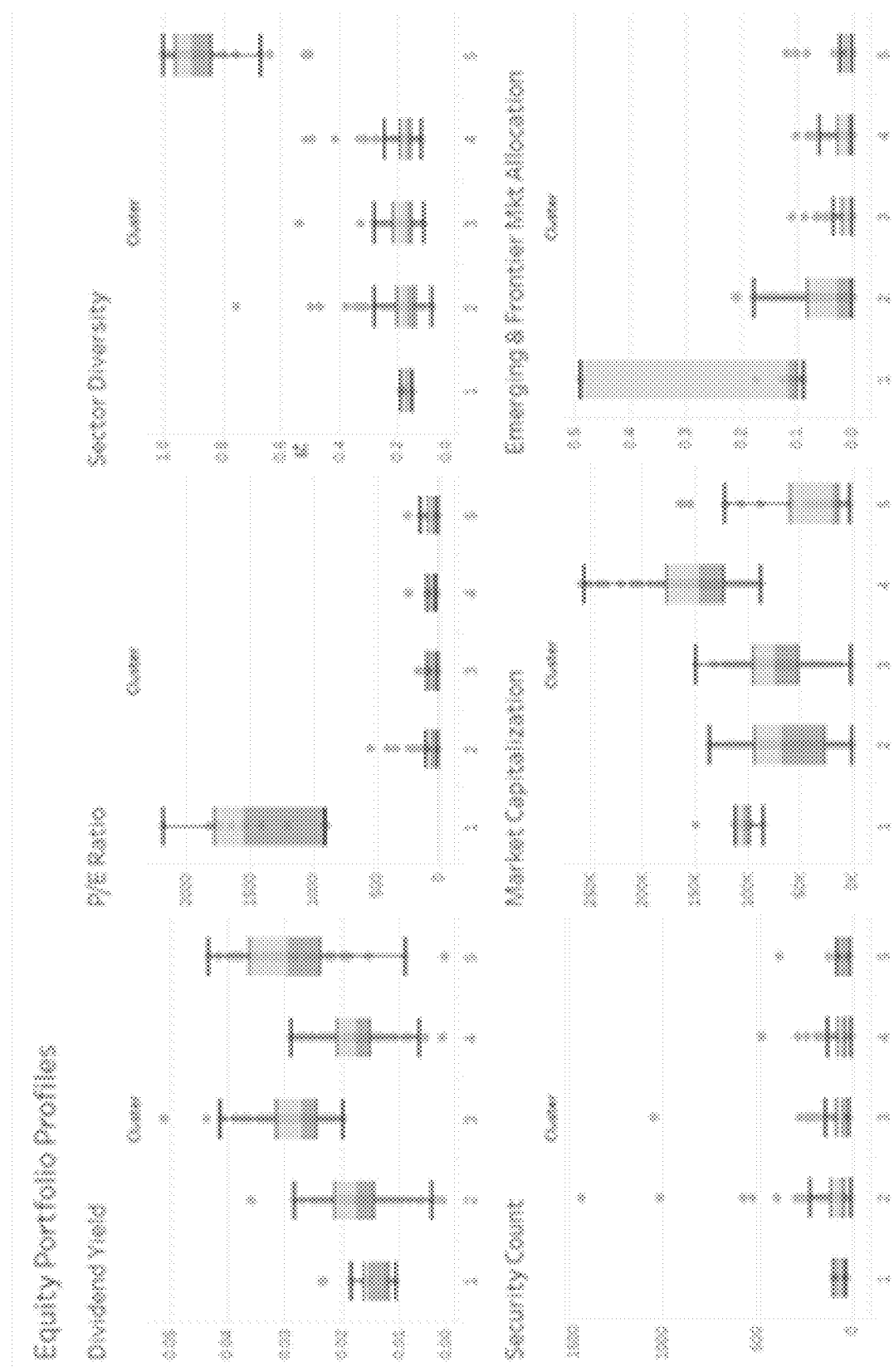

FIG. 5B is an example interface rendered by the interface engine according to some embodiments. The interface shows a point in time range in values across all relevant features for each portfolio grouping, this example focusing on the features for the Global Equity group and the 5 underlying fund clusters. These results can be used by clients to view areas of specialization for their fund(s) within their grouping.

Figure 6:
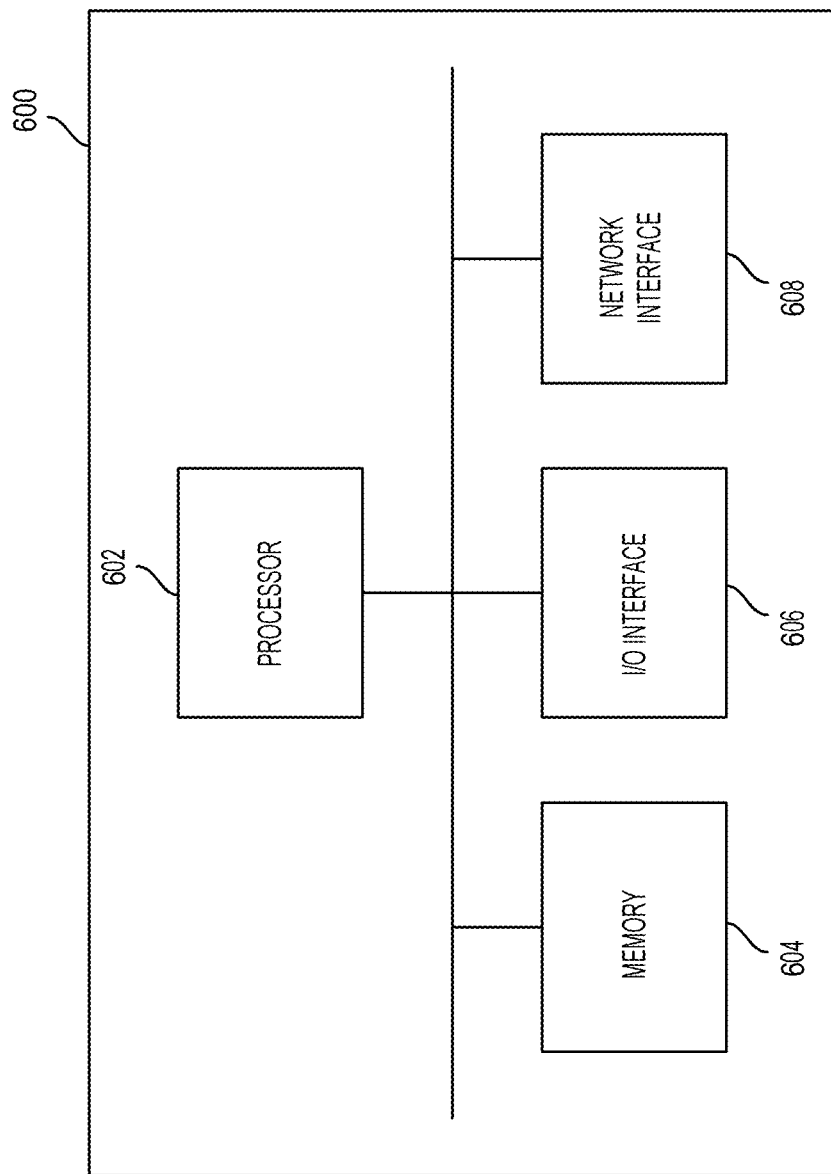
FIG. 6 is a schematic diagram of computing device, exemplary of an embodiment.

FIG. 6 is a schematic diagram of a computing device 600 such as a server. As depicted, the computing device includes at least one processor 602, memory 606, at least one I/O interface 606, and at least one network interface 608.

Processor 602 may be an Intel or AMD x86 or x64, PowerPC, ARM processor, or the like. Memory 604 may include a suitable combination of any type of computer memory that is located either internally or externally such as, for example, random-access memory (RAM), read-only memory (ROM), compact disc read-only memory (CDROM), or the like.

Each I/O interface 606 enables computing device 600 to interconnect with one or more input devices, such as a keyboard, mouse, camera, touch screen and a microphone, or with one or more output devices such as a display screen and a speaker. A visualization engine is provided in 606 that renders software displays.

Each network interface 608 enables computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 600 is operable to register and authenticate users (using a login, unique identifier, and password for example) prior to providing access to applications, a local network, network resources, other networks and network security devices. Computing devices 600 may serve one user or multiple users.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Figure 7:
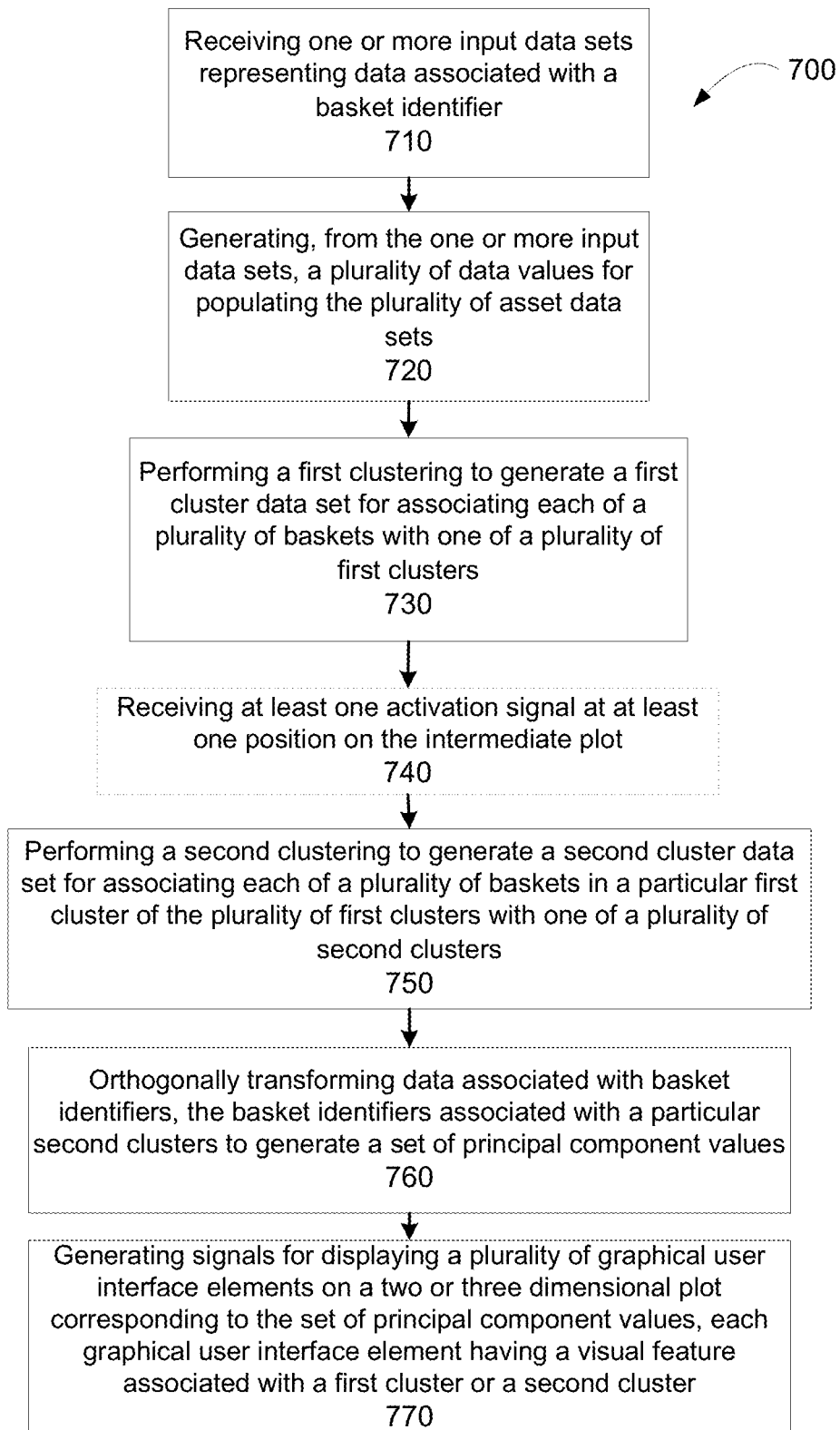
FIG. 7 is a flowchart showing aspects of an example method.

FIG. 7 shows aspects of an example method 700 for dynamically presenting graphical user interface elements in a graphical user interface for a plurality of multi-dimensional data sets.

At 710, one or more processors in the system receive one or more input data sets representing data associated with the basket identifier. In some embodiments, the basket identifier identifies a plurality of asset data sets as a basket. For example in some embodiments the basket identifier is associated with a basket of assets such as a mutual fund. As described herein or otherwise, in some embodiments, the plurality of asset data sets associated with the basket of data sets associated with asset underlying a mutual fund or other basket of assets.

In some embodiments, the input data sets can include custody system holding data, market data facility data, or data associated with a client's holdings or account which themselves may comprise one or more baskets.

In some embodiments, this data can be received in real or near real time, periodically, or at any other suitable time interval.

At 720, one or more processors in the system, generate from the input data sets, a plurality of data values for populating the plurality of asset data sets. In some embodiments, the one or more processors normalize or standardize at least a portion or subset of the data values.

In some embodiments, standardizing some or all of the data values can include subtracting a mean value from a data value associated with the particular field and dividing the result of the subtraction from an absolute deviation from the mean value. In some embodiments, such a transformation may improve clustering and/or orthogonal transformations and/or data visualizations as some of these features may be sensitive to scale.

In some embodiments, generating the input data sets includes mapping, formatting, translating, or otherwise manipulating input data for storage in the respective asset data sets.

At 730, one or more processors perform a first clustering to generate a first cluster data set. In some embodiments, the first cluster data set associates each of a number of baskets with one of any number of clusters. In some embodiments, generating the first cluster data set includes associating each basket with tag or identifier associated with a particular cluster.

As described herein or otherwise, in some embodiments, the clustering is performed using the K-medoid algorithm. In some embodiments, the clustering is performed based on a geographic location, a type allocation, and/or any other feature or characteristic associated with a basket.

At optional block 740, the one or more processors can receive one or more activation signals at one or more positions on an intermediate plot displayed on a display. In some embodiments, the processors generate signals for displaying the intermediate plot including multiple intermediate graphical user interface elements. Each intermediate graphical user interface element corresponds to a basket. In some embodiments, each graphical user interface element is displayed with visual future associated with a cluster. For example, in some embodiments, visual features can include a colour of the graphical user interface element, a shape of the graphical user interface element, a pattern and/or any other discernible future which can visually distinguish a graphical user interface element from another. For example, all baskets associated with cluster one may be a first colour, and all baskets associated with cluster two may be a second colour. The use of these distinguishing visual features for clusters can be similarly applied to a second or any other clustering described herein or otherwise.

In some embodiments, the processors can receive an activation signal at a position on the intermediate plot. Some example of this may include clicking selecting or otherwise identifying an intermediate graphical user interface element or medoid on the plot.

At 750, the one or more processors perform a second clustering to generate a second cluster data set. The second cluster data set associates each basket in a first cluster with a second level or sub-cluster. In some embodiments, the second clustering can be based on one or more parameters associated with the first or higher-level cluster.

In embodiments including optional block 740, the second clustering can be based on one or more features associated with meteoroids corresponding to the one or more positions of the received activation signal(s).

In other embodiments, the second clustering can be based on any feature described herein or others. In some embodiments, the second clustering can be based on features associated with first or higher level cluster. For example for fixed income funds or baskets, features such as time to maturity and credit rating may be applicable, but other features such as price-to-earnings ratios and capitalizations may not be applicable as they are relevant to equity funds. More balanced funds, relevant features are computed for different security types within the fund and then are normalized based on their market value. In some embodiments, the features selected for the second level clustering may be selected via user input. In some embodiment, the user interface only displays relevant features based on the baskets and clusters at the first level as noted above or otherwise.

In some embodiments, the processors perform the second clustering automatically.

In some embodiments, the second clustering associates the baskets with one of a particular number of clusters. In some embodiments, the particular number of clusters is determined based at least in part on a silhouette measure.

At 760, the processors transform the data associated with the basket identifiers associated with one or more of the second clusters to generate a set of principal component values. In some embodiments, this is based on a principal component analysis algorithm. Other data transformations for identifying components with variances can also be used.

In some embodiments, the principal components identify the features having the most variability in the data set. In some embodiments, displaying data along these axes can make differences or anomalies easier to distinguish.

At 770, the processors generate signals for displaying graphical user interface elements on a two or three dimensional plot. In some embodiments the axes of the two or three dimensional plot correspond to the set of principal component values. Similar to the above, each graphical user interface element corresponds to a basket and has a visual feature associated with the first or second cluster.

Additionally or alternatively to displaying the graphical user interface elements, in some embodiments the processors are configured to detect an anomaly in the data set associated with one or more baskets. In some embodiments, the anomaly is based on distances between the principal component values associated with a particular basket and principal component values associated with one or more other baskets or with an average of the other baskets. In some embodiment, the processors are configured to generate signals for outputting an alert or message when anomaly is detected. In some embodiments, outputting an alert message can include displaying a message or graphical user interface element on a display, generating an audible output, transmitting a message, and/or any other mechanism for communicating or alerting a user to the anomaly.

In some embodiments, the processors are configured for generating one or more adjustment mechanisms or recommendations based on the distances and the principal component fields associated with the set of principal component values. In some embodiments, the recommendations can include purchasing and/or selling one or more assets having one or more features. In some embodiments these one or more features may be based on the principal component values identified above or otherwise.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (e.g. personal computer, server, virtual environment, cloud computing system, network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer-implemented method for dynamically presenting graphical user interface elements in a graphical user interface for a plurality of multi-dimensional data sets, the method comprising:
   receiving one or more input data sets representing data associated with a basket identifier, the basket identifier for identifying a plurality of asset data sets as a basket;
   generating, from the one or more input data sets, a plurality of data values for populating the plurality of asset data sets;
   performing a first clustering to generate a first cluster data set for associating each of a plurality of baskets with one of a plurality of first clusters, the first clustering based on at least one parameter associated with the basket identifier;
   generating signals for displaying an plurality of intermediate graphical user interface elements on an intermediate plot, each intermediate graphical user interface element corresponding to a basket of the plurality of baskets, each graphical user interface element having a visual feature associated with a first cluster;
   receiving at least one activation signal at at least one position on the intermediate plot;
   performing a second clustering to generate a second cluster data set for associating each of a plurality of baskets in a particular first cluster of the plurality of first clusters with one of a plurality of second clusters, the second clustering based at least on features associated with one or more medoids corresponding to the at least one position of the at least one activation signal;
   orthogonally transforming data associated with basket identifiers, the basket identifiers associated with a particular second clusters to generate a set of principal component values; and
   generating signals for displaying a plurality of graphical user interface elements on a two or three dimensional plot corresponding to the set of principal component values, each graphical user interface element having a visual feature associated with a first cluster or a second cluster.

2. The method of claim 1, wherein the first clustering is performed using a K-medoid algorithm.

3. The method of claim 1, wherein the first clustering is performed based on at least one of: a geographic location or a type allocation associated with the plurality of baskets.

4. The method of claim 1, wherein performing the second clustering associates each of the plurality of baskets with one of n clusters, where n is determine based at least in part on a silhouette measure.

5. The method of claim 1, wherein the visual feature is a color or a shape.

6. The method of claim 1, wherein generating at least a subset of the plurality of data values for populating the plurality of asset data sets comprises standardizing at least one value associated with a data field, wherein standardizing the at least one value associated with the data field includes: subtracting a mean value from a data value associated with the data field of one or the plurality of asset data sets; and dividing a result of the subtraction from an absolute deviation from the mean value.

7. The method of claim 1, comprising: receiving an activation signal at a location corresponding to a particular graphical user interface element of the plurality of graphical user interface elements; and
   generating signals for displaying at least a portion of the data associated with the basket identifier corresponding to the particular graphical user interface element.

8. The method of claim 1, comprising: detecting an anomaly in a data set associated with a first basket based on distances between principle component values associated with the first basket and principle component values associated with one or more principle component values of other baskets in the plurality of baskets; and generating signals for outputting the anomaly.

9. The method of claim 8, comprising: generating one or more adjustment recommendations based on the distances and principle component fields associated with the principle component values.

10. A computer implemented system, including one or more computer processors coupled to computer memory, the one or more computer processors configured for:
   receiving one or more input data sets representing data associated with a basket identifier, the basket identifier for identifying a plurality of asset data sets as a basket;
   generating, from the one or more input data sets, a plurality of data values for populating the plurality of asset data sets;
   performing a first clustering to generate a first cluster data set for associating each of a plurality of baskets with one of a plurality of first clusters, the first clustering based on at least one parameter associated with the basket identifier;
   generating signals for displaying an plurality of intermediate graphical user interface elements on an intermediate plot, each intermediate graphical user interface element corresponding to a basket of the plurality of baskets, each graphical user interface element having a visual feature associated with a first cluster;
   receiving at least one activation signal at at least one position on the intermediate plot;
   performing a second clustering to generate a second cluster data set for associating each of a plurality of baskets in a particular first cluster of the plurality of first clusters with one of a plurality of second clusters, the second clustering based at least on features associated with one or more medoids corresponding to the at least one position of the at least one activation signal;

orthogonally transforming data associated with basket identifiers, the basket identifiers associated with a particular second clusters to generate a set of principal component values; and generating signals for displaying a plurality of graphical user interface elements on a two or three dimensional plot corresponding to the set of principal component values, each graphical user interface element having a visual feature associated with a first cluster or a second cluster.

11. The system of claim 10, wherein the first clustering is performed using a K-medoid algorithm.

12. The system of claim 10, wherein the first clustering is performed based on at least one of: a geographic location or a type allocation associated with the plurality of baskets.

13. The method of claim 10, wherein performing the second clustering associates each of the plurality of baskets with one of n clusters, where n is determine based at least in part on a silhouette measure.

14. The system of claim 10, wherein the visual feature is a color or a shape.

15. The system of claim 10, wherein generating at least a subset of the plurality of data values for populating the plurality of asset data sets comprises standardizing at least one value associated with a data field, wherein standardizing the at least one value associated with the data field includes: subtracting a mean value from a data value associated with the data field of one or the plurality of asset data sets; and dividing a result of the subtraction from an absolute deviation from the mean value.

16. The system of claim 10, wherein the one or more computer processors are configured for: receiving an activation signal at a location corresponding to a particular graphical user interface element of the plurality of graphical user interface elements; and generating signals for displaying at least a portion of the data associated with the basket identifier corresponding to the particular graphical user interface element.

17. The system of claim 10, wherein the one or more computer processors are configured for: detecting an anomaly in a data set associated with a first basket based on distances between principle component values associated with the first basket and principle component values associated with one or more principle component values of other baskets in the plurality of baskets; and generating signals for outputting the anomaly.

18. The system of claim 17, wherein the one or more computer processors are configured for: generating one or more adjustment recommendations based on the distances and principle component fields associated with the principle component values.

19. A non-transitory computer readable medium, storing machine interpretable instructions, which when executed, configure one or more processors for receiving one or more input data sets representing data associated with a basket identifier, the basket identifier for identifying a plurality of asset data sets as a basket;

generating, from the one or more input data sets, a plurality of data values for populating the plurality of asset data sets;

performing a first clustering to generate a first cluster data set for associating each of a plurality of baskets with one of a plurality of first clusters, the first clustering based on at least one parameter associated with the basket identifier;

generating signals for displaying an plurality of intermediate graphical user interface elements on an intermediate plot, each intermediate graphical user interface element corresponding to a basket of the plurality of baskets, each graphical user interface element having a visual feature associated with a first cluster;

receiving at least one activation signal at at least one position on the intermediate plot;

performing a second clustering to generate a second cluster data set for associating each of a plurality of baskets in a particular first cluster of the plurality of first clusters with one of a plurality of second clusters, the second clustering based at least on features associated with one or more medoids corresponding to the at least one position of the at least one activation signal;

orthogonally transforming data associated with basket identifiers, the basket identifiers associated with a particular second clusters to generate a set of principal component values; and generating signals for displaying a plurality of graphical user interface elements on a two or three dimensional plot corresponding to the set of principal component values, each graphical user interface element having a visual feature associated with a first cluster or a second cluster.

* * * * *